United States Patent [19]

Hunt

[11] 4,358,051
[45] Nov. 9, 1982

[54] THERMOSTAT ASSEMBLY FOR AN ENGINE COOLING SYSTEM

[75] Inventor: Albert A. Hunt, Ongar, England

[73] Assignee: Ford Motor Company, Dearborn, Mich.

[21] Appl. No.: 232,753

[22] Filed: Feb. 9, 1981

[51] Int. Cl.³ .............................................. F01P 7/02
[52] U.S. Cl. .................................. 236/34.5; 123/41.54
[58] Field of Search ................................ 236/34, 34.5; 123/41.54; 137/202, 562

[56] References Cited

U.S. PATENT DOCUMENTS

| 2,170,725 | 8/1939 | Mason | 137/202 X |
| 4,052,965 | 10/1977 | Morris | 165/40 X |
| 4,300,718 | 11/1981 | Bever | 236/345 |

FOREIGN PATENT DOCUMENTS

| 951692 | 10/1956 | Fed. Rep. of Germany | 236/34 |
| 1248932 | 2/1960 | France | 236/34 |
| 722913 | 2/1955 | United Kingdom | 236/34 |

Primary Examiner—William E. Tapolcai
Attorney, Agent, or Firm—Robert E. McCollum; Clifford L. Sadler

[57] ABSTRACT

A thermostat assembly for an engine cooling system having a coolant flow passage extending from an inlet connected to the engine and an outlet connected to the engine radiator, a thermostat valve positioned in the inlet to control the flow of fluid, a bleed valve mounted in an air bypass passage to allow air past the thermostat valve during filling, and an integral fill passage through which the whole cooling system may be filled; the fill inlet being the highest point in the housing, the bleed valve being positioned at a level higher than the thermostat valve so that air is completely purged from the system during filling; a further separate air vent passage communicating with the bypass passage to vent air from the top of the engine to which the housing is fixed.

5 Claims, 7 Drawing Figures

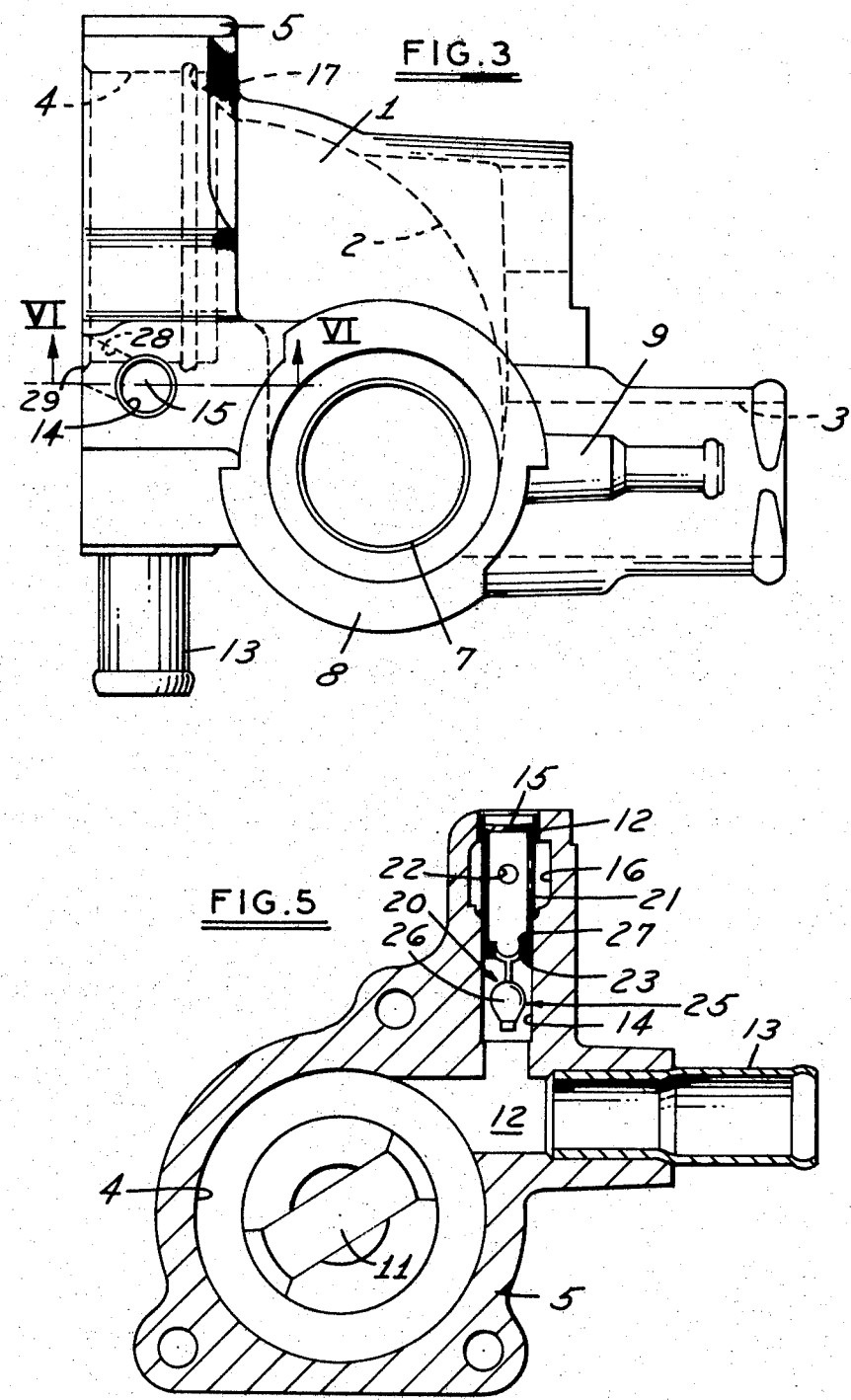

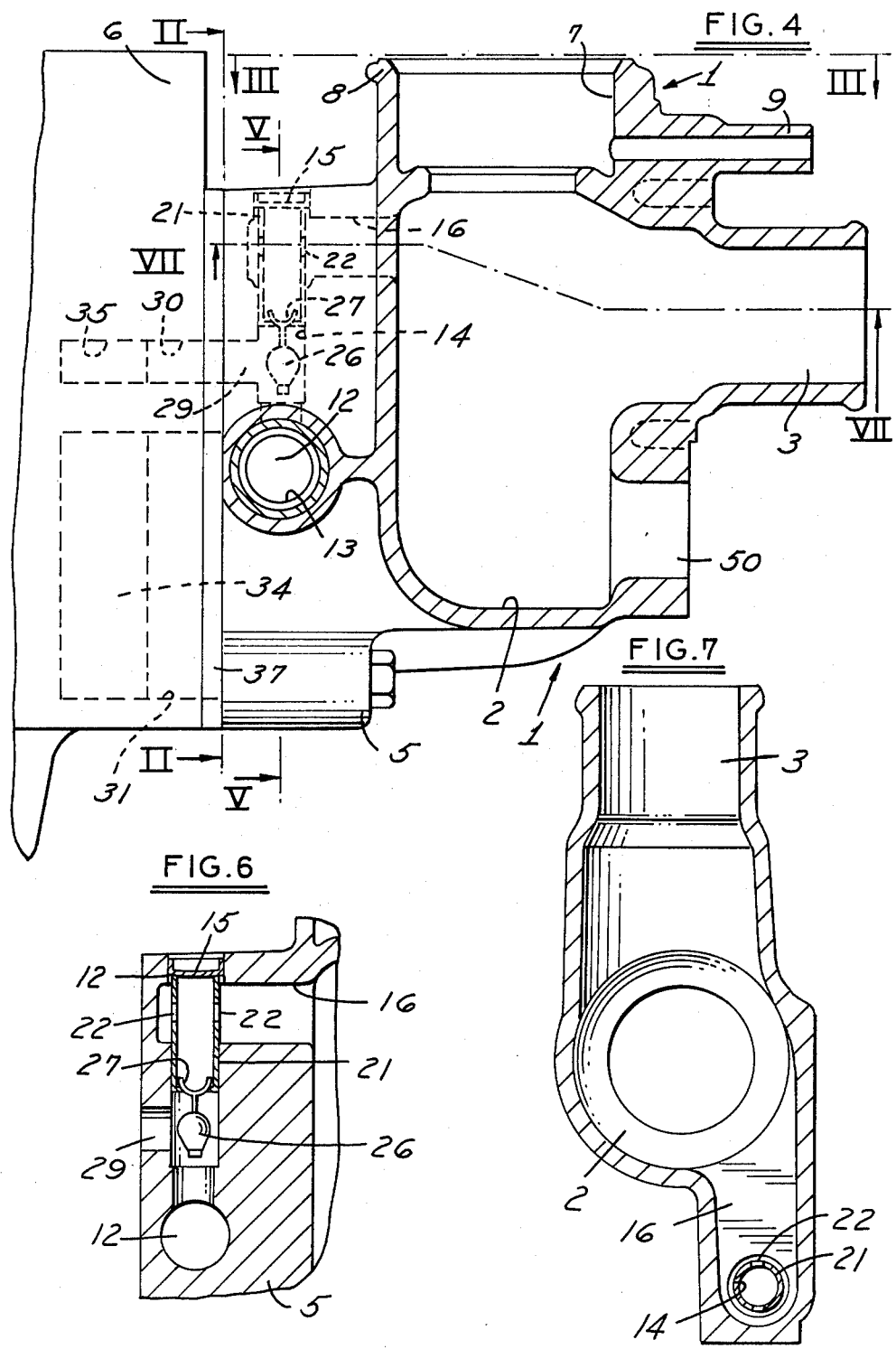

THERMOSTAT ASSEMBLY FOR AN ENGINE COOLING SYSTEM

DESCRIPTION

This invention relates to a thermostat assembly for an engine cooling system.

Conventional engine cooling systems include a thermostat valve mounted in a coolant flow passage in a housing that is mounted on the engine. The valve operates in response to coolant temperature so that at low temperatures coolant is prevented from circulating through the engine radiator and, therefore, the engine can warm up quickly.

When the cooling system is filled, the thermostat valve normally is closed. Therefore, to purge air from the system, an air bleed valve usually is provided. This bleed valve normally is positioned either in the thermostat valve unit, as, for example, shown in British Pat. No. 1,029,545, or in a separate bypass passage that connects to the flow passage on opposite sides of the valve, as shown in British Pat. No. 1,401,396.

Usually the bleed valve will comprise a float type valve member that moves onto or off a valve seat to prevent leakage of coolant when the water level in the cooling system reaches the level of the bleed valve. There is a risk, however, that air locks can be formed in the part of the system above the bleed valve. Although the air would be displaced when the thermostat valve opened, the cooling system would not be filled to the correct capacity.

It is an object of this invention to provide an engine cooling system thermostat assembly comprising a housing having a coolant flow passage that extends between an inlet port connected to the engine and an outlet port connected to the engine radiator, the outlet port being higher than the inlet port; a thermostat valve in the flow passage operable in response to the coolant temperature to permit or prevent flow of fluid through the housing; an air bypass passage connected to the flow passage around the thermostat; and a bleed valve in the bypass passage allowing air flow past the thermostat valve during filling of the engine cooling system; the housing incorporating a fill passage intersecting the flow passage and having a fill inlet on top of the housing at a level higher than either the flow passage inlet or outlet the air bleed valve being positioned in the housing at a level higher than the thermostat valve.

By incorporating the fill passage inlet at the highest point in the housing and arranging the air bleed valve higher than the thermostat valve, the amount of air trapped in the cooling system when it is being filled is minimized.

Both the fill passage and the air bleed passage preferably discharge into that portion of the flow passage adjacent the outlet to the radiator. This then permits the bleed valve to be positioned level with the outlet, assuring that the system can be filled substantially completely with coolant when the thermostat valve is closed.

Generally, the optimum location for the housing is above the engine so that all of the air will be easily purged from the engine cooling passages during filling. In some engines, however, this is not possible, and the housing must be positioned on one side of the engine. In such cases, an air vent passage preferably is provided in the housing itself, which is the case of the present invention. The vent passage in this case has an inlet that connects to the cylinder head air vent passages at a point that is above the opening for the thermostat valve. The outlet end of the vent passage discharges into the air bleed bypass passage at a level at least as high as the housing outlet, but below the bleed valve. The housing then can be located on the side of the engine with the vent passage arranged to vent air from the cooling passages in the top of the engine through the air bleed passage that is above the inlet of the housing.

The location of the bleed valve in a separate air bypass passage also has the advantage that the thermostat valve, which usually will be in the form of a unit, can be arranged with its valve seat in any orientation, for example, vertical or horizontal.

It is another object of the invention, therefore, to provide a thermostat assembly as described having a vent passage connecting air in the top of the engine to the air bleed passage at a location below the bleed valve but above the thermostat valve, to assure a purge of all the air from the engine cooling passages during filling.

Other objects, features, and advantages of the invention will become apparent upon reference to the succeeding detailed description thereof, and to the drawings illustration the preferred embodiment thereof; wherein:

FIG. 3 is a plan view of the assembly of FIGS. 1 and 2;

FIG. 4 is a cross sectional view taken along line IV—IV of FIG. 1; and showing the assembly mounted on an engine;

FIG. 5 is a vertical cross-section taken along line V—V of FIG. 4;

FIG. 6 is a cross-sectional view taken along line VI—VI of FIG. 3; and

FIG. 7 is a cross-sectional view taken along line VII—VII of FIG. 1 and looking from the bottom up.

Figure 1:
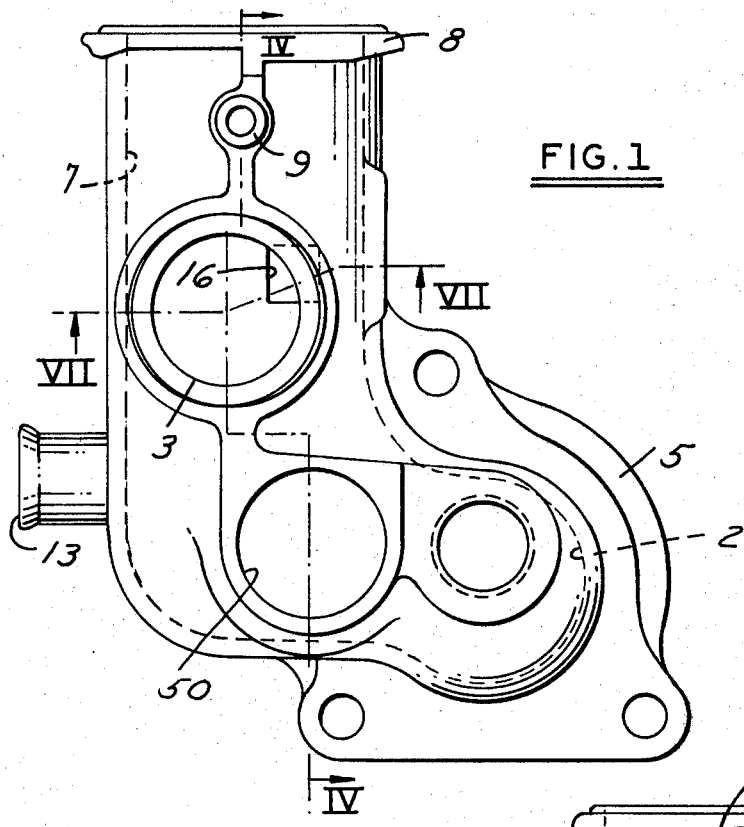
FIG. 1 is a front elevational view of a thermostat assembly constructed in accordance with the invention and showing the assembly as it would be positioned on an engine.
Figure 2:
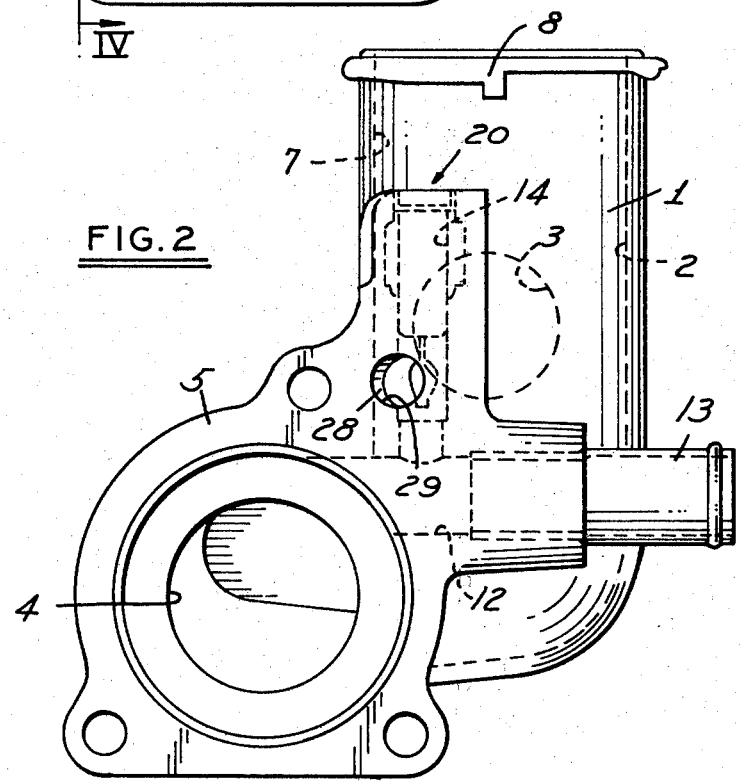
FIG. 2 is a rear elevation of the assembly of FIG. 1.

Referring to the drawings, the thermostat assembly comprises a housing 1 (FIG. 2) in the form of a unitary casting. The housing has a coolant flow passage 2 (FIG. 3) that extends through the housing from an outlet port 3 to a lower inlet port 4. Port 3 is adapted to be connected by a flexible hose to the radiator. Port 4 is surrounded by a mounting flange 5 by means of which the housing 1 may be bolted to an engine 6 contiguous to the cooling passages, as shown in FIG. 4.

A fill passage 7 is formed integral with housing 1 to permit coolant fluid to be introduced into the housing in a convenient manner. The fill passage 7 has an inlet 8 that is flanged (FIG. 3) to receive a pressure cap (not shown) of conventionl construction. The vertical fill passage 7 intersects flow passage 2 adjacent outlet port 3, as best seen in FIG. 4.

The fill inlet 8 is positioned above outlet 3 of the flow passage, and, therefore, above inlet port 4. When installed in the vehicle, inlet 8 is the highest point of the cooling system. An overflow pipe 9 projects outwardly from fill passage 7 immediately below inlet 8.

A threaded bore 50 is formed in housing 1 to receive a temperature sensor (not shown).

As seen in FIG. 3, a seat 17 is formed in flange 5 at the rear of inlet port 4 to receive, as indicated schematically in FIG. 5, a thermostat valve unit 11 of conventional construction. The valve unit 11 opens and closes in response to the temperature of the fluid in passage 2 to control flow of coolant to the radiator. At room temperature, in this case, the valve unit 11 is closed.

The mounting flange 5 also includes a horizontal transverse bore 12 that extends laterally (FIGS. 2 and 5) and essentially tangentially from a topmost portion of inlet port 4 that is higher than the thermostat valve unit 11. The mouth of the transverse bore 12 includes a connecting pipe 13 for coupling the housing 1 to the inlet of a vehicle heater matrix.

A vertical air bypass passage or bore 14 extends downwardly through flange 5 to intersect transverse bore 12. The upper end of bore 14 is closed by a cap 15 (FIG. 5). As best seen in FIGS. 1, 4, 6 and 7, passage 14 intersects a horizontal cavity or recess 16 that is cast into the internal wall of flow passage 2. Recess 16 connects vertical bore 14 to flow passage 2 at a point on the same level as outlet port 3, and on the side of thermostat valve unit 11 downstream from that of the bore 12. The transverse bore 12, vertical bore 14, and cavity 16 thus form a bypass passage around the thermostat valve unit 11.

An air bleed valve assembly 20 (FIGS. 5 and 6) of the "jiggle pin" type is positioned in vertical bore 14. It comprises a tube 21 having perforations 22 around its upper end that register with the inlet end to recess 16. The lower end of tube 21 is turned inwardly to act as a seat 23 for a valve member 25. The valve member 25 comprises a float 26 having a density less than water, moulded onto a supporting pin 27 so that the float is suspended from the lower end of tube 21 for vertical movement into and out of sealing engagement with the seat 23. The tube 21 is positioned in the upper end of bore 14 at a vertical level higher than the thermostat valve unit 11 and at approximately the same level as the center of outlet port 3 (FIG. 4).

An air vent passage 28 (FIGS. 1 and 2) extends obliquely from the face of flange 5 to discharge into vertical bore 14. The inlet 29 to vent passage 28 is positioned at a level higher than inlet port 4. The outlet from vent passage 28 is on the same level as the inlet 29 and intersects the vertical bore 14 immediately below bleed valve 25 and above valve unit 11.

In use, as shown in FIG. 4, the housing 1 is bolted to an engine 6 with a gasket 37 therebetween. The gasket includes two apertures not shown that register respectively with inlet port 4 and the inlet 29 of vent passage 28 (FIG. 2), and connect them to respective outlet ports 31, 30 in the engine. The lower outlet port 31 is the outlet for the main coolant flow passages of the engine indicated schematically at 34. The upper air outlet 30 communicates with a vent passage 35 in the cylinder head, which is the highest point in the internal cooling passages in the engine.

When cold coolant is introduced into the empty cooling system through fill passage 7, the thermostat valve unit 11 will close. Consequently, coolant will flow through housing outlet 3 to the radiator, not shown, to flow past the usual water pump into the engine block and cylinder head coolant passages to slowly fill them. As it does so, air in the coolant passages will be pushed ahead into housing inlet 4, into transverse bore 12, and up vertical bore 14. This will lift valve 26 enough to allow the air to flow past the valve into cavity 16 to be expelled out the fill inlet 8. Air also will enter bore 14 from the vent passage 28.

The coolant level in the cooling system will continue to rise until it fills bypass passage 12 and rises in bore 14. When it reaches the level of the bleed valve 20, float 26 will be raised into sealing engagement with seat 23 to prevent any passage of coolant. By this time, however, all the air will have been displaced from the engine flow passages either through housing inlet 4 or through the air vent passage 28. Consequently, the engine cooling passages will be completely full of coolant. Since bleed valve 20 is at a level higher than thermostat valve unit 11, the valve unit 11 will be completely immersed. Additionally, since the outlet from bypass channel 12 through bore 14 and recess 16 lies on a level with outlet port 3, the only volume in the system not containing water or coolant is that in the immediate vicinity of fill passage inlet 8. The system then can, therefore, be topped off with coolant without any fear of air being trapped in the system.

While the invention has been shown and described in its preferred embodiment, it will be clear that many changes and modifications may be made thereto without departing from the scope of the invention.

I claim:

1. A thermostat assembly for an engine cooling system comprising a housing having a coolant flow passage therethrough having an inlet and an outlet with the outlet vertically higher than the inlet, a thermostat valve positioned in the inlet and operable in response to the coolant temperature to block or permit the flow of fluid through the flow passage, an air bypass passage having one end operatively connected to the inlet on the upstream side of the thermostat and having the opposite end connected to the outlet downstream of the valve, and a bleed valve in the bypass passage movable to an open position to allow air flow past the thermostat valve when the latter is closed as the engine cooling system is filled with coolant and movable to a closed position by fluid pressure, characterized by the housing having a fluid fill passage that connects to the coolant passage and has an inlet at a level higher than the coolant passage outlet and through which coolant may be introduced into the flow passage, the bleed valve being located in the housing at a level higher than the highestmost point of the thermostat valve.

2. An assembly as in claim 1 wherein the housing also includes an air vent passage having an inlet and outlet at approximately the same levels, the vent passage inlet being connected to the engine at a point above the inlet to the coolant passage, the vent passage outlet communicating with the bypass passage below the level of the bleed valve but above the thermostat valve.

3. An assembly accordingly to claims 1 or 2 wherein the fill passage discharges into the flow passage adjacent the flow passage outlet.

4. An assembly according to claims 1 or 2 wherein the bypass passage has an outlet at a level approximately the same as the level of the flow passage outlet.

5. An assembly according to claims 1 or 2 wherein the bleed valve comprises a valve seat and a float movable into and out of sealing engagement with the valve seat and arranged to seal the valve seat when the cooling system is full of coolant.

* * * * *